Nov. 6, 1962 J. T. SCHWIEGER 3,062,410
PROPORTIONING DISPENSER
Filed May 23, 1960 3 Sheets-Sheet 1
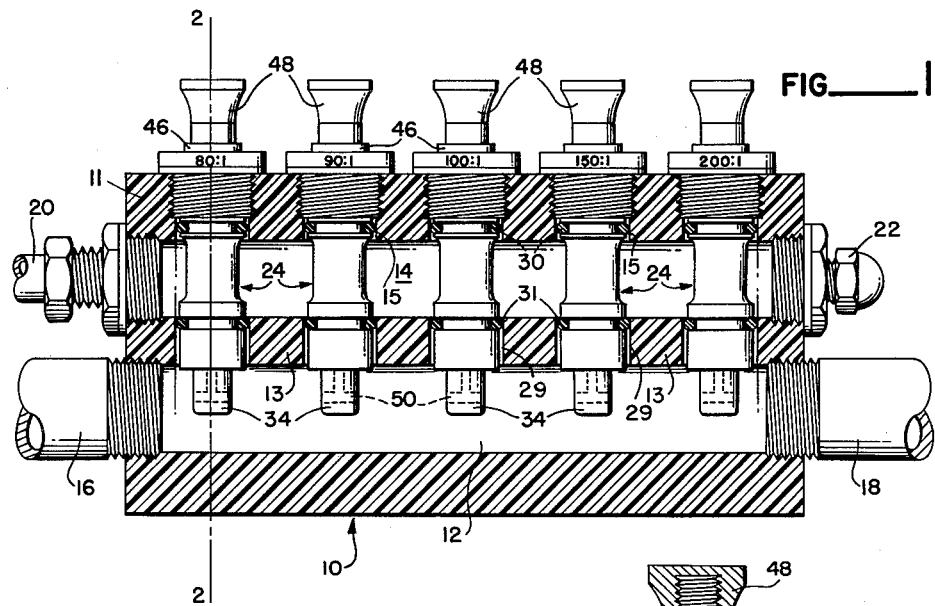
FIG. 1
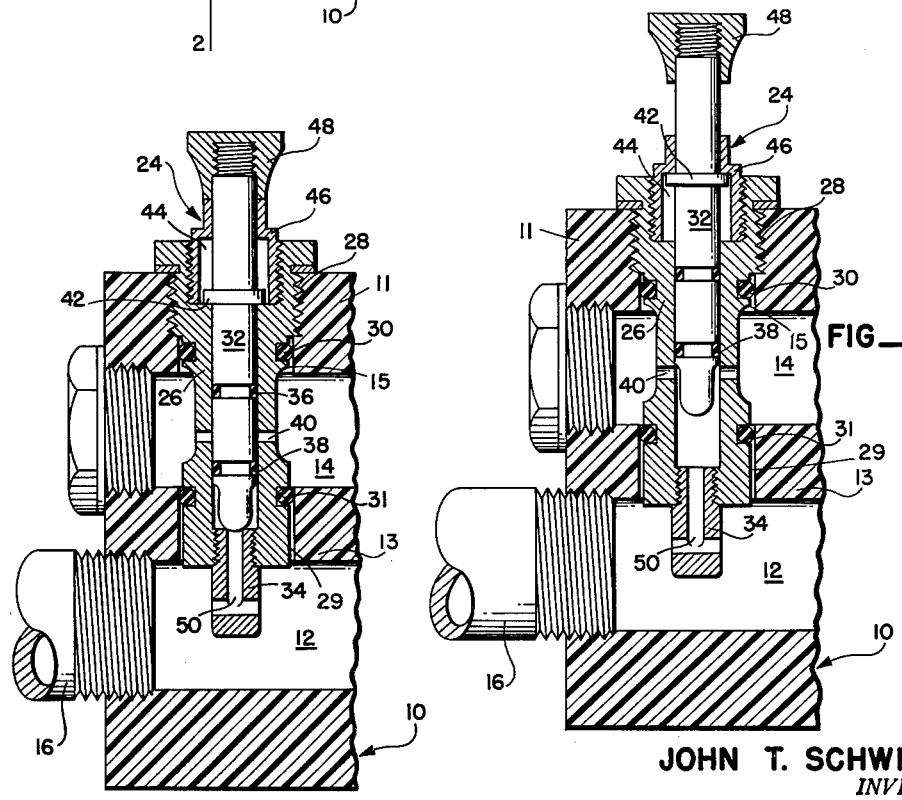
FIG. 2
FIG. 3
JOHN T. SCHWIEGER
INVENTOR.
BY Smith & Tuck Nov. 6, 1962

J. T. SCHWIEGER 3,062,410

PROPORTIONING DISPENSER

Filed May 23, 1960

JOHN T. SCHWIEGER
*INVENTOR.*

BY
*Smith & Tuck*

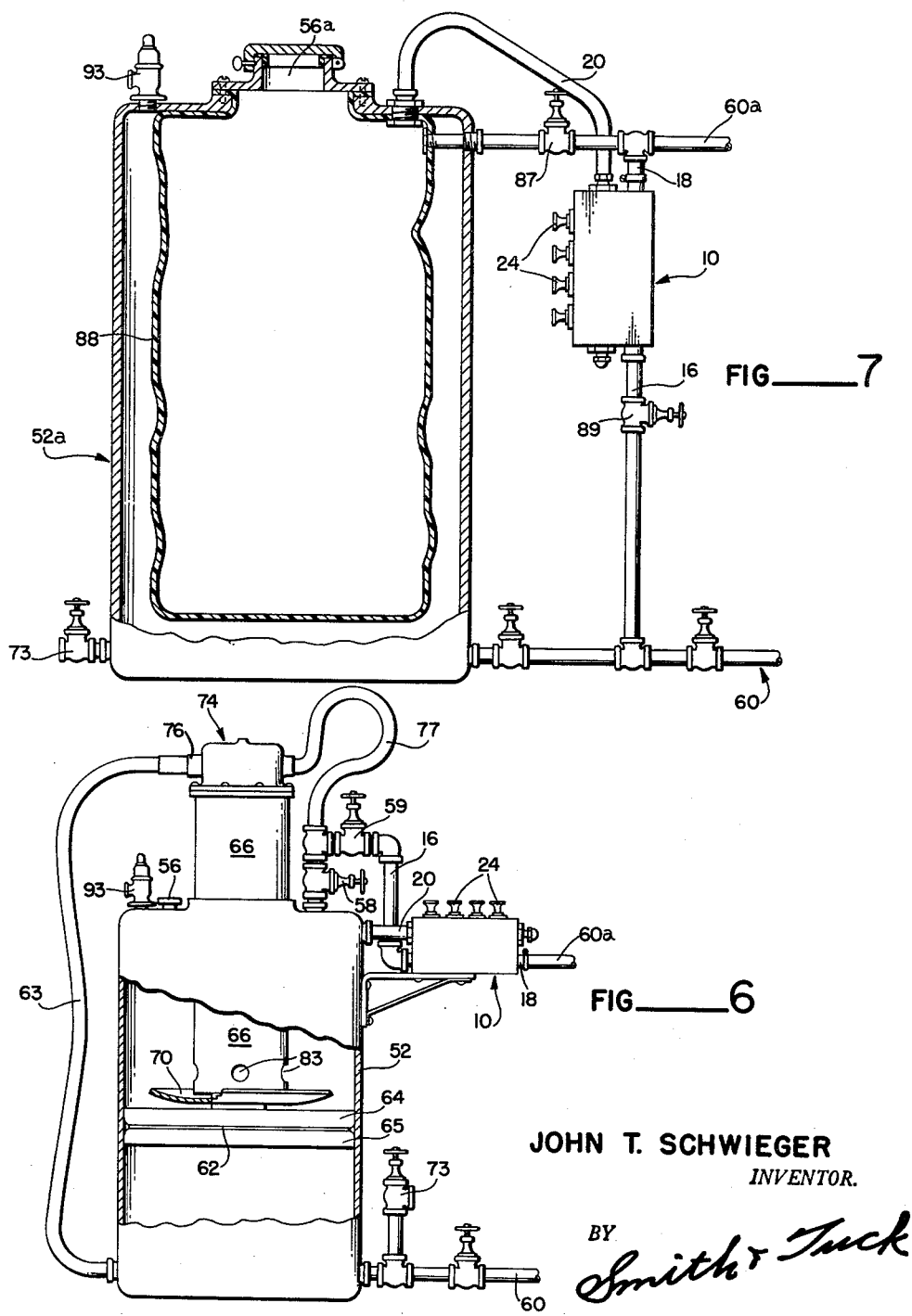

United States Patent Office 3,062,410
Patented Nov. 6, 1962

3,062,410
PROPORTIONING DISPENSER
John T. Schwieger, 9919 SE. 320th St., Auburn, Wash.
Filed May 23, 1960, Ser. No. 31,038
6 Claims. (Cl. 222—133)

This present invention relates to the general art of dispensers of the type dispensing admixtures in water. More specifically this invention relates to a proportioning dispenser in which very accurate ratios between the liquid and the admixture can be established and maintained throughout the full period of dispensing. Certain of the features of this application may be used with the dispenser shown in my U.S. Patent 2,935,994.

Current studies in the raising of fruit and vegetables and the raising of fowl and meat animals have developed a need for using medicaments, sprays and the like which are poisonous but which, if administered in controlled strength of dilution, as with water, are lethal to vermin, pests and bacteria with no ill effects upon the host. This is particularly true of antibiotics and antibacterial substances. These subjects are normally treated under colloidal chemistry in which very small particles of unusually slowly solvent chemicals or actual metals or metal salts are used with such a small particle size that their effect upon animal, insect and bacterial life has in certain usage produced phenomenal results. It is, however, very necessary that means be provided so that colloidal and microscopic sized particles of treatment substances can be dispensed as an admixture to water and this captive solution or mixture used as an admixture with a definite ratio maintained between the colloidal substance and the water which forms the diluent and carrying vehicle.

This present invention provides a means for dispensing these various materials as admixtures to water and provides an exact proportioning that can be changed as the need arises. It is therefore believed that this present invention provides a solution to the problem of exact proportioning in dispensing admixtures and is especially useful for handling liquid fertilizers and the like.

A principal object of this present invention therefore is to provide a proportioning, dispensing device in which water under pressure is the transporting vehicle for admixtures and in which the admixtures are very accurately proportioned to the water.

A further object of this present invention is to provide means for using water under pressure as the propelling means for the water being dispensed and in combination therewith provides a proportioning unit which will accurately proportion an admixture to the vehicle water throughout a wide range of water pressure without the necessity of making subsequent adjustments in the proportioning means.

A further object of this invention is to provide means which will agitate a confined body of water sufficiently to give uniform distribution of an admixture to the water under confinement and to then introduce this water and admixture combination into a stream of water so that the admixture may be carried to a desired point of use.

Further objects, advantages and capabilities will be apparent from the disclosure in the drawings or may be comprehended or are inherent in the device.

In the drawings,

FIGURE 1 is a longitudinal sectional view through a proportioning device, particularly applicable to the need of this present invention.

FIGURE 2 is a fragmentary, vertical sectional view taken along the line 2—2 of FIGURE 1 through one of the injection control valves and showing the valve mechanism in its closed position.

FIGURE 3 is a view taken in the same sense as FIGURE 2 but showing the valve in its open or dispensing position.

FIGURE 6 is an elevation taken in the same sense as FIGURE 4 and of the same equipment, but showing the changed position of certain parts after a portion of the admixture has been dispensed.

FIGURE 7 is an elevation of a simplified form of hydraulic dispenser which may be used with the proportioning means of this invention to dispense accurate quantities of a soluble admixture.

Figure 4:
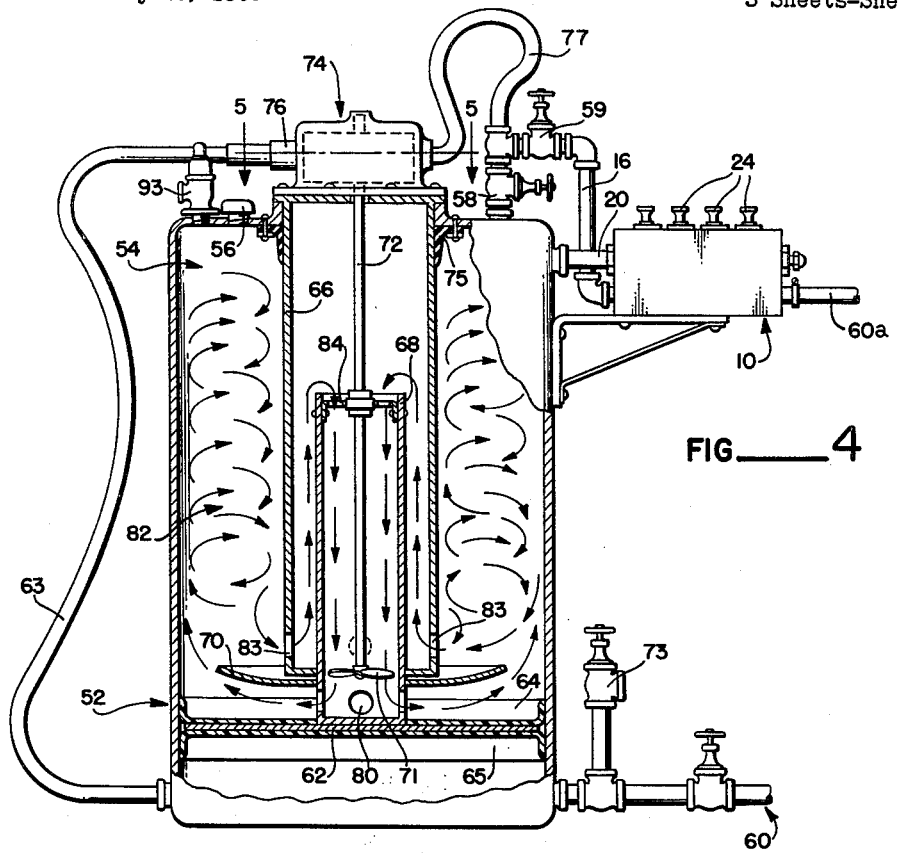
FIGURE 4 is an elevation, broken away and sectioned in part illustrating a preferred form of hydraulic dispensing unit adapted for use in this present invention.

Referring to the drawings, throughout which like reference characters indicate like parts, the numeral 10 designates generally the housing of my proportioning device which is preferably molded of plastic material or metal, said housing having an upper, outer wall 11 with a plurality of threaded bores 15 thereon. This is provided with a water passageway 12, and an admixture compartment 14 separated by an inner wall 13. The water passageway has a supply pipe 16 and a discharge pipe 18. The admixture compartment 14 is provided with a supply pipe 20 and a discharge fitting 22 normally only used during the cleaning of the equipment.

Disposed transversely of passageway 12 and compartment 14 and providing a controlled passageway therebetween, are a plurality of injector control valves indicated generally by 24. These valves have a body 26, which is threadedly secured into bores 15 in upper wall 11 by coacting threads 28 and aligned further by bores 29 in the inner wall 13 and are sealed against leakage along their outer spaced bearing surfaces by the O-rings 30 and 31. Coaxially disposed within body 26 is the needle valve 32. In FIGURE 2 the needle valve member is shown as closed with the O-ring sealing the fluid off from the orifice. In FIGURE 3 the needle valve is shown as in its dispensing position. Referring to FIGURE 2 with the valve shown in the closed position it will be noted that sealing rings are provided at 36 and 38 and such sealing rings, which may be O-rings or the equivalent, are disposed on opposite sides of the admixture supply passageway 40. A stop collar 42 is provided to limit the upward movement of needle valve 32. This stop collar has a passageway 44 around the needle valve body which is formed within the plug sleeve 46, the plug sleeve being threadedly secured in the upper end of body 26. The upper end of the needle valve member is threaded for the operating knob 48.

The discharge orifice 50 formed in orifice fitting member 34 is of a definite diameter and this diameter varies with each of the injector control valve assemblies. The actual area of the orifice should bear a definite ratio to the area of supply pipe 16. In FIGURE 1 a set of values has been given representing the area of the orifice in a fractional part of a square inch of the various valve assemblies and these areas correspond to the proportioning ratios indicated above the various knobs 48. It is believed understandable that these orifice diameters have an area that has an area ratio with respect to pipe 20 corresponding to the various ratios indicated, as 80:1, 90:1, 100:1, 150:1, or 200:1. It is to be understood that the values given are merely exemplary but if the same plan is followed proportioning ratios of any reasonable range of sizes can be provided for. These parts and the water flowing through admixture passageway 14 constitute a second water pressure actuated means.

Figure 5:
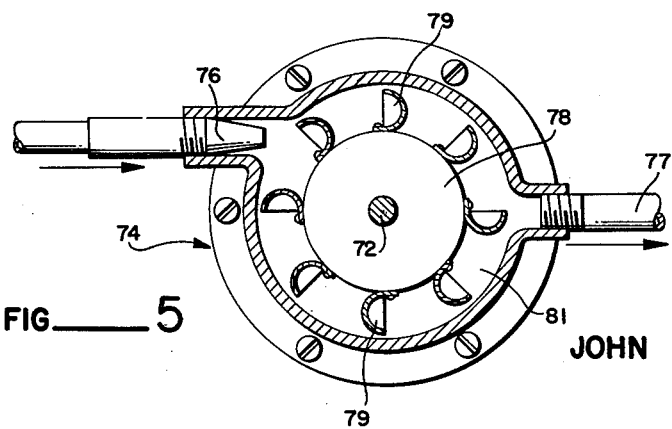
FIGURE 5 is a horizontal, sectional view taken along the line 5—5 of FIGURE 4.

Referring to FIGURES 4, 5 and 6, these views show a preferred form of dispensing unit that serves to keep spray materials, fertilizing materials, medicaments of all kinds, either metallic and not soluble or chemical compounds which are either insoluble or have a low degree of solubility, either in solution or in suspension. Under such circumstances it is necessary that the insoluble materials be kept in agitation within a fluid, pressure tight, captive water container 52 which is preferably of cylindrical form. This provides the captive chamber 54 into which the insoluble admixtures are deposited through the filling opening 56. The desired amount of water is introduced through valve 58, which is, in effect, in the water supply line 60.

Disposed for reciprocation within container 52 is a floating piston 62 which employs two nonmetallic sealing cups as 64 and 65. Coaxially secured with respect to piston 62 is an outer partition cylinder 66 and the inner partition cylinder 68. Secured to cylinder 68 is a deflector vane 70. Axially disposed with respect to cylinders 66 and 68 is a rotatable shaft 72 which is provided at one end with a propeller 71 and at the other end with a water motor 74 secured to the outer end of said outer partition cylinder. This motor is shown in horizontal sectional view in FIGURE 5. It consists of the water jet 76, a water discharge pipe 77 and a revolvable runner 78 having a plurality of cups 79. These cups are semi-cylindrical in form and operate much as a Pelton wheel except that the interior cavity 81 is normally substantially full of water at all times. Runner 78 drives the propeller shaft 72.

Assuming that the captive admixture container chamber 54 is filled with water and the admixture, water can be run through the equipment and out the discharge pipe 60a without dissipating any of the captive water or any of the admixture within chamber 54. This condition will maintain as long as the various valve members 24 in the proportioner 10 remain closed. However, the flow of water through pipe 60 and out pipe 60a driving propeller 70 creates a turbulence and a circulation in the water as indicated by the arrows, wherein the water is driven out through a plurality of lowermost openings 80. Deflector 70 causes the water to impinge upon the side walls of container 52 and this, because of the outermost of the two partition cylinders, creates a turbulence in the water as illustrated by the arrows indicated at 82. This turbulent water with the admixture normally present finds its way back, assisted by deflector 70, through a plurality of openings 83 where the water circulates up inside of container 66 and down through openings 84 in the top of cylinder 68. This downwardly directed water then goes out opening 80 completing a cycle.

Referring to FIGURE 6 it will be noted that the piston 62 has been driven upwardly by water being introduced through pipe 60 and this provides a first or prime water pressure operated means. When a discharge is made through pipe 60a this discharge carries with it a portion of the captive water from within chamber 54 permitting the piston to rise. The space above the piston to the top of container 52 is filled with water having the admixture present. As piston 62 is driven upwardly it forces cylinder 66 upwardly and it passes, in part, out of container 52, carrying with it cylinder 68 together with the propeller and its gear and the water driven motor 74. A nonmetallic seal 75 prevents leakage around cylinder 66.

In FIGURE 7 is shown a modified form of dispenser which is quite satisfactory for use with the proportioning device 10 when the admixture for the captive water is soluble and so does not need agitation to keep it in solution or suspension. In this arrangement water is introduced through pipe 60 and passes out pipe 60a as before. Container 52a is provided with a capped filling opening 56a and a captive water and admixture discharge pipe 20. In this instance instead of piston 65 it is possible to use a plastic or rubber sack 88 which will contain the captive water and admixture. The water pressure being introduced through pipe 60 will tend to collapse the plastic or rubber sack and force the water out through pipe 20, through the proportioner 10 and the captive water and the water supply are there joined and will pass out through pipe 60a as a mixture, to the point of use.

The construction of the proportioner is illustrated in FIGURES 1, 2 and 3 and the operational flow circuit is illustrated in FIGURES 4, 6 and 7. The operation is substantially the same in all cases; the supplied water entering from pipe 60 and passing through passageway 12 has injected into it an amount of the captive water with its admixture from container 52 or sack 88 which admixture amount is controlled normally by the use of one of the various valves 24 which is fully opened to the position illustrated in FIGURE 3. Usually the operator using knob 48 opens the valve corresponding to the proportioning ratio he desires. In FIGURE 1 have been illustrated ratios from 80:1 to 200:1. It is also possible to combine a plurality of these valves. If several are opened at the same time each would dispense into the water stream in passageway 12 its proportionate amount and thus increase the actual amount of admixture present in the discharged water.

Referring to FIGURES 4, 5 and 6, water under pressure from pipe 60 enters into the container 52 below piston 62 and passes out and upwardly through hose 63 to water motor 74. As there is so far no stoppage of water, it will flow through motor 74, out hose 77 and through valve 58 with valve 59 closed into the captive water chamber 54 in container 52 above piston 62. When a desired amount of water is drawn into chamber 54 the desired medicament, spray, antibiotic fertilizer or the like is added through filler 56 as an admixture. The combination of the admixture to the captive water produces a liquid admixture which is introduced, by pipe 20, into the proportioner 10, then into the flow of untreated water from pipe 60 and the water is then lead to a point of use.

The proportioning ratio is unchanged by changes in water pressure owing to the fact that a change in water pressure affects the rate of discharge of the admixture by either piston 62 or sack 88 proportionately and the ratio set into the proportioner remains unchanged. Valve 73 is for testing and cleaning.

The operation of the simplified dispenser of FIGURE 7 is similar to the power mixing type of FIGURE 4 except valve 87 is normally closed when the dispenser is in use and valve 89 is opened. The medicament etc. is introduced into sack 88 through filling opening 56a and captive water is introduced into sack 88 through valve 87 when opened. A relief valve may be provided at 93. A manually operated stirring means may be introduced through filling opening 56a. This must be removed before putting the dispenser into use to avoid conflict with sack 88.

It is believed that it will be clearly apparent from the above description and the disclosure in the drawings that the invention comprehends a novel construction of proportioning dispenser.

Having thus disclosed my invention, I claim:

1. A proportioning dispenser for dispensing admixtures in water using water under pressure to operate the device, comprising: a water container of cylindrical shape; a liquid proportioning device having a housing with an outer longitudinal wall and an inner longitudinal wall parallel thereto; a water passageway and an admixture compartment extending substantially through the length of said housing in parallel relationship to each other and separated by said inner longitudinal wall; a plurality of pairs of aligned transverse bores passing through said outer longitudinal wall of said housing and through the said inner wall, separating said water passageway and said admixture compartment; a plurality of manually operated injector control valves, secured one in each of the pairs of aligned transverse bores, and providing individual controllable passageways between the said admixture compartment and water passageway; a floating piston disposed for reciprocation within said container; a water pressure supply means for actuating said piston and thus forcing a flow of water through said water passageway; means for providing a flow of fluid admixture through said admixture compartment and said injector control valves and a common supply of water under pressure to provide the water pressure to simultaneously actuate said water supply means to said water passageway and supply water pressure to said admixture compartment.

2. The combination according to claim 1 wherein said injector control valve comprises: a body having an axial bore; spaced sealing means for engagement with a pair of said aligned transverse bores; a transverse admixture supply passageway in said body, each end of which is open to said admixture compartment; a discharge orifice coaxially aligned with said axial bore; a needle valve disposed for reciprocation in said axial bore and for selectively opening or closing said admixture supply passageway and an operating knob secured to a portion of said needle valve which extends outside of said housing.

3. The subject matter of claim 1 in which said manually operated injector control valves each comprise a body threadedly secured in said outer longitudinal wall and having spaced axially aligned bearing surfaces in said outer longitudinal wall and said inner longitudinal wall, each with a resilient O-ring seal; an axial bore in each of said bodies; a needle valve disposed for reciprocation within each of said axial bores; an admixture supply passageway in each of said bodies connecting said admixture compartment and said bores; spaced annular sealing rings seated in said needle valves disposed on opposite sides of said admixture supply passageway when the said valves are closed.

4. The combination according to claim 3 further provided with orifice fitting members threadedly secured to the lower end of said bodies and axially of said needle valves; an axial discharge orifice in each of said orifice fitting members, the cross-section area of which controls the proportioning ratio of said valves.

5. A proportioning dispenser for dispensing admixtures in water using water under pressure to operate the device, comprising: a pressure tight captive water container; a water pressure operated means for discharging captive water from said container; means for introducing water and an admixture into said container; a water motor for agitating said captive water and said admixture; a liquid proportioning device having a rectangular casing with a water passageway extending through the length thereof and an admixture compartment extending substantially the length thereof; said casing having an outer wall longitudinally thereof, and a second longitudinal wall separating said admixture chamber and said water passageway, second wall also having a plurality of bores spaced longitudinally thereof; each of said second mentioned plurality of bores being aligned with one of the bores in said outer wall, forming therewith a pair of aligned bores; a plurality of manually operated injector control valves, secured, one in each of the pairs of aligned transverse bores, and providing individual controllable passageways between the admixture compartment and water passageway; an orifice fitting secured, one to each of said controllable passageways and each having a discharge orifice the diameter of which determines the discharge proportioning of said control valves; means for forcing a flow of fluid admixture through said admixture compartment and said injector control valves and a common supply of water under pressure to provide the water pressure to said water pressure operated means and provide said flow of fluid admixture.

6. The subject matter of claim 5 in which said water pressure operated means for agitating said captive water and said admixture comprises: an outer partition cylinder centrally positioned for vertical movement in said captive water container and to pass upwardly through the top thereof; an inner partition cylinder concentrically disposed with said outer partition cylinder; a plurality of openings in said outer partition cylinder and said inner partition cylinder for water circulation; an axially disposed rotatable shaft in said inner partition cylinder having a propeller on its lower end and a water motor, secured to the outer end of said outer partition cylinder, for circulating and agitating said captive water and said admixture.

References Cited in the file of this patent
UNITED STATES PATENTS

| | | |
|---|---|---|
| 981,753 | Fowler | Jan. 17, 1911 |
| 2,229,903 | Schmohl et al. | Jan. 28, 1941 |

FOREIGN PATENTS

| | | |
|---|---|---|
| 1,097,262 | France | Feb. 16, 1955 |